Nov. 11, 1930. E. BRUCE 1,781,363
ELECTRICAL TESTING SYSTEM
Filed July 6, 1927

INVENTOR
EDMOND BRUCE
By E.W.Griggs
ATTORNEY

Patented Nov. 11, 1930

1,781,363

UNITED STATES PATENT OFFICE

EDMOND BRUCE, OF RED BANK, NEW JERSEY, ASSIGNOR TO BELL TELEPHONE LABORATORIES, INCORPORATED, OF NEW YORK, N. Y., A CORPORATION OF NEW YORK

ELECTRICAL TESTING SYSTEM

Application filed July 6, 1927. Serial No. 203,744.

This invention relates to electrical testing systems.

An object of the invention is to facilitate measurements of electrical quantities or characteristics, as for example, measurement of field strengths of electromagnetic waves or examination of the overall audio-frequency output characteristic of a radio receiving system.

A method of voltage measurement specifically described herein is to apply the unknown voltage and a known voltage, one at a time, to the input circuit of a double detection radio receiver which has its beating oscillator wave modulated by a voltage from a source of audio-frequency voltage, and, in each case balance the audio-frequency output voltage of the radio receiver against an equal balancing voltage obtained from the source of audio-frequency voltage. The balance is indicated by zero tone in a telephone receiver to which the two voltages to be balanced against each other are applied in series. The balancing voltage is maintained the same when the variable comparison voltage is applied to the radio receiver as when the voltage to be measured is applied, the balance condition being obtained by adjustment of the comparison voltage. Therefore, for the condition of balance, the voltage to be measured is equal to the known comparison voltage.

The listening method of balancing the receiver output against the voltage obtained from the source of audio-frequency voltage is useful for example in measuring field strengths of electromagnetic waves, especially when the receiver output would fall below the capabilities of a deflecting meter.

A specific aspect of the invention is a field strength measuring system employing this balancing method and an example of such a system is described hereinafter.

As illustrating other specific aspects of the invention, there are also described hereinafter a method and apparatus for employing this balancing method to determine the variation of audio-frequency output of a radio receiver with respect to audio-frequency, for constant field strength at the receiving antenna, or for employing this balancing method to measure the amplitude of the voltage output of the receiver or the phase shift produced in the signal by the receiver.

Other objects and aspects of the invention will be apparent from the following description and claims.

Figure 1:
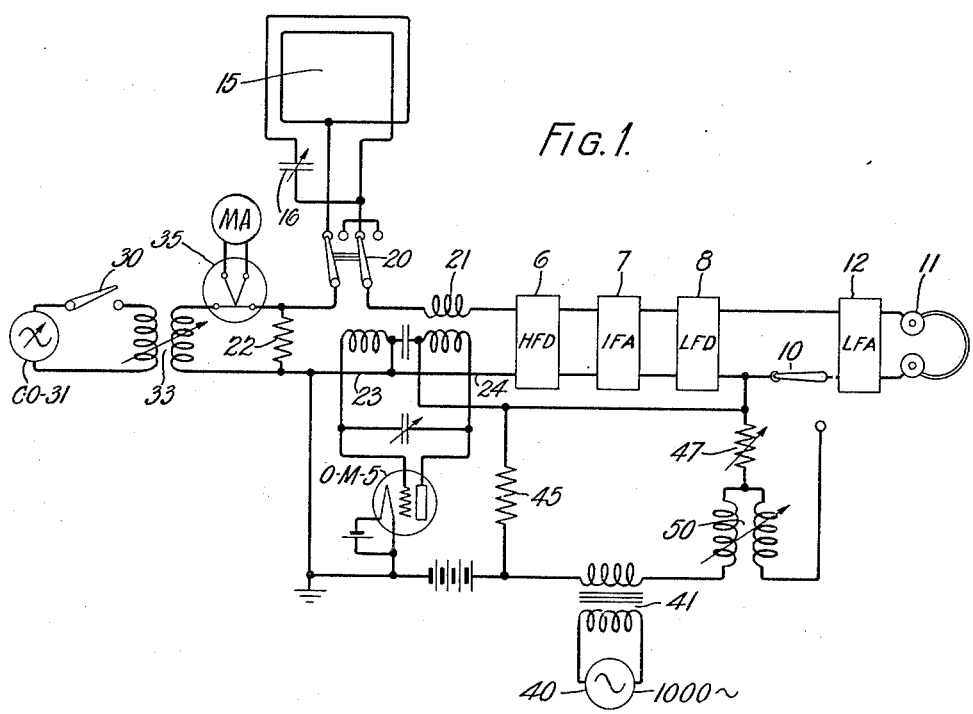
Figure 2:
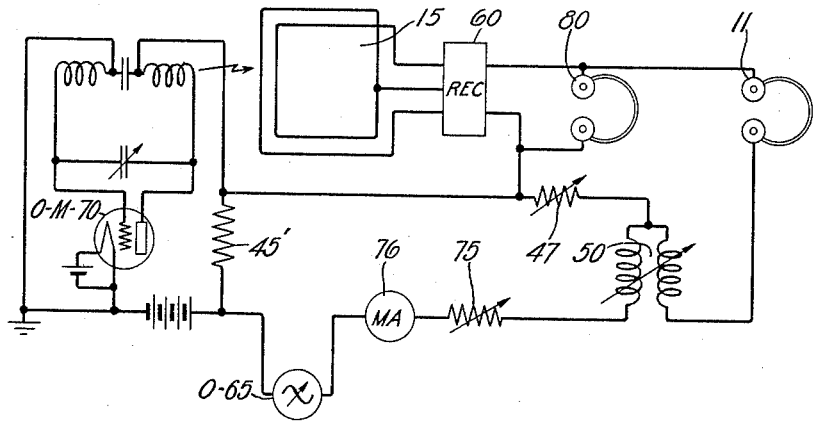

Fig. 1 is a circuit diagram of a system embodying a form of the invention adapted for measurement of field strengths of electromagnetic waves; and Fig. 2 is a circuit diagram of a form of the invention adapted for determining the overall gain-frequency characteristic of an antenna and radio receiver.

In the system of Fig. 1 is a double detection radio receiver comprising a beating oscillator O—M—5, a high frequency detector 6, an intermediate frequency amplifier 7, and a low frequency detector 8. A switch 10 connects an indicator in the output circuit of detector 8. The indicator may comprise a telephone receiver 11 preceded if desired by an audio-frequency amplifier 12. A loop antenna 15 is tuned by a condenser 16 to the frequency of waves whose field strength is to be measured. A switch 20 connects half of the loop in the input circuit of the detector 6, in series with a coil 21, a resistance 22 of known value and conductors 23 and 24. The coil 21 is coupled to the beating oscillator.

By throwing switch 20 to the right and closing a switch 30, a comparison voltage produced across resistance 22 by a comparison oscillator C—O—31 can be substituted for the voltage from the loop, in the high frequency detector input circuit. The comparison oscillator is a variable frequency source, so that it may be adjusted to generate voltage of the frequency to which the loop is tuned. The magnitude of the comparison voltage produced across resistance 22 can be varied as indicated by a coupling transformer 33, and the magnitude of this voltage can be determined, for example, by a thermo-couple and milliammeter 35.

An audio-frequency source of modulating voltage, comprising for example a one-thousand cycle tuning fork vibrator 40 and a voltage step-up transformer 41, supplies voltage to a circuit including a resistance 45 in the plate circuit of the beating oscillator, a variable resistance 47 and one winding of a variable mutual inductance 50.

The audio-frequency voltage thus produced across resistance 45 modulates the output wave of the beating oscillator, so that the wave induced in coil 21 by the beating oscillator is a wave of frequency differing from that to which the loop is tuned an amount equal to the desired intermediate frequency and modulated by a 1000 cycle wave. Thus the presence of a carrier or high frequency voltage in the input circuit of the high frequency detector, due for example to a continuous carrier wave received from the loop antenna or due to the wave received from the comparison oscillator, will be indicated at the output of the set by a 1000 cycle tone. The magnitude of this 1000 cycle output is a function of the strength of the received wave.

Regarding the operation of the system, if the known input voltage of high frequency to the detector 6 from the comparison oscillator be adjusted to produce the same magnitude of low frequency output voltage from the low frequency detector that the input voltage of the same high frequency from the loop produces, then the magnitudes of the two input voltages are equal. Even when the magnitudes of the outputs are too small to admit of measurement by a deflecting meter, their equality can be established by separately balancing them through the telephone receiver 11, against the same voltage from the transformer 41, and thus the human factors of volume judgment and memory can be eliminated in comparing the outputs to determine the input from the loop and consequently the field strength of the waves received by the loop. In thus determining the input from the loop, and the field strength, the system is first tuned to receive the waves whose field strength is to be measured, switches 10, 20 and 30 being in the positions shown. Then to obtain an audio frequency balance, switch 10 is operated to its other position and resistance 47 and mutual inductance 50 are varied until no note is heard in the telephone receiver 11. Switches 30 and 20 are then operated to their other positions, so that the voltage from the loop is replaced in the input circuit of the high frequency detector by a voltage of the same frequency from the comparison oscillator, and other conditions are not disturbed except that this comparison voltage is varied until zero tone in the telephone receiver 11 again indicates a condition of balance. The known magnitude of the comparison voltage under this last condition is equal to the voltage which the loop delivered to the high frequency detector under the first condition of audio frequency balance. This voltage is half of the voltage across the loop, and as is well known by dividing it by half the step up ratio of the loop the voltage induced in the loop by the signal is obtained. As is also well known the step-up ratio of the loop is given by the ratio $\frac{2\pi fl}{r}$ where $l$ is the inductance and $r$ the resistance of the loop and $f$ is the frequency to which the loop is tuned. This ratio is a measure of the resonance effect of the loop and gives the voltage E across the loop at resonance as $\frac{2\pi fl}{r}$ times the voltage $e$ induced in the loop. The induced voltage $e$ gives the field strength on division by the effective height of the loop. Denoting the field strength by E and the effective height of the loop by $h$, these quantities are given by the well known formulæ:

$$h = \frac{1}{3} \times 10^{-10} \times 2\pi f \times A \times N$$

and $E = \frac{e}{h}$, where A is the area of the loop in square centimeters and N is the number of turns in the loop.

In the system of Fig. 2 the audio-frequecy balancing method described is used to ascertain the magnitudes of the audio-frequency output of a radio receiver 60 at different audio-frequencies with constant field strength at the receiving antenna 15.

An oscillator O—65 of variable audio-frequency supplies modulating voltage to a resistance 45′ in the plate circuit of a high frequency oscillator and modulator O—M—70, through a circuit including the resistance 45′, variable resistance 47, one winding of mutual inductance 50, and a variable resistance 75. Oscillator modulator O—M—70 is the same type as O—M—5 of Fig. 1, the modulating action of oscillator O—65 occurring in the same manner as that of oscillator 40 of Fig. 1. The modulated wave from the high frequency oscillator is received by loop 15, the high frequency oscillator thus simulating a radio telephone transmitter having a flat output-frequency characteristic.

In the operation of the system, the frequency of oscillator O—65 is adjusted to different audio-frequencies, the current in milliammeter 76 being maintained the same for each frequency by adjustment of resistance 75, and for each frequency an audio-frequency balance is obtained in the output circuit of receiver 60 by so adjusting resistance 47 and mutual inductance 50 that no tone of the frequency of oscillator O—65 is heard in the telephone receiver 11. Denoting this frequency by $f = \frac{\omega}{2\pi}$, the magnitude of the effective resistance of resistor 45′ as $R_2$, the magnitude of the resistance 47 as $R_1$, and the mutual inductance of element 50 as $M_1$, for each condition of balance the ratio $$\frac{R_1 + j\omega M_1}{R_2}$$

is the measure of the receiver audio-frequency characteristic, the output voltage V for each condition of balance being $I(R_1+j\omega M_1)$ where I is the current in the milliammeter 76. A curve plotted between this balancing ratio and the audio frequencies will show the relative output voltages of the receiver for the different frequencies. If the characteristic is flat the ratio will remain constant as the audio-frequency is varied.

If it is also desired to take into account the effect upon the system of the impedance variation with frequency of an indicating means normally used with the radio receiver, as for example, a loud speaking receiver or a telephone head set, that indicating means may be included in the output circuit of the receiver during the test, as indicated by the head set 80 in the drawing.

It is noteworthy that the system of Fig. 2 can detect the generation of audio-frequency harmonics by the radio receiver, since the current flowing from the oscillator O—65 will be free from components which would balance or neutralize such harmonics in the telephone receiver 11.

The system is capable of measuring either absolute or relative amplitudes of the output voltage of the radio receiver, as well as the phase of the output voltage with respect to the source. As indicated above, the absolute value of the output voltage$=I(R_1+j\omega M_1)$. The phase angle of the output voltage compared with the input voltage is $$\theta = \tan-\frac{1\omega M_1}{R_1}.$$

What is claimed is:

1. The method of determining the relative values of two wave magnitudes which comprises comparing one, by a null method, with the magnitude of a given wave, and comparing the other, by a null method, with a given wave having a magnitude bearing a known relation to the magnitude of said first mentioned given wave.

2. The method which comprises altering a wave in accordance with another wave, producing from the alteration product a third wave having the frequency of one of said first two waves and having a magnitude which is a function of the magnitude of one of said first two waves, and balancing one of said first two waves against said third wave.

3. The method which comprises modulating a wave in accordance with another wave, detecting the modulation product to obtain a third wave having the frequency of said other wave and having a magnitude which is a function of the magnitude of said first wave, and balancing said other wave against said third wave.

4. The method which comprises modulating a wave in accordance with a second wave, detecting the modulation product to obtain a third wave having the frequency of one of said first two waves, balancing said third wave against the one of said first two waves which has the frequency of said third wave, combining one of said first two waves and a fourth wave, detecting the product of the latter combination to obtain a fifth wave having the frequency of one of said last two mentioned combining waves, and balancing said fifth wave against the one of said last two mentioned combining waves having the frequency of said fifth wave.

5. The method which comprises modulating each of two waves in accordance with a third wave, detecting the modulation product in the case of each of said first two waves to obtain two waves having the frequency of said third wave and having magnitudes which are the same function of the magnitudes of said first two waves, respectively, and balancing said third wave against each of said other waves having the frequency of said third wave.

6. The method which comprises modulating a beating wave with a second wave of comparatively low frequency, combining the modulated beating wave with a third wave of unknown magnitude and of frequency higher than that of said beating wave, detecting the resulting wave to obtain a fourth wave of said comparatively low frequency, and balancing said two waves of the latter frequency against each other.

7. The method which comprises modulating a beating wave with a second wave of comparatively low frequency, combining the modulated beating wave with a third wave of unknown magnitude and of frequency higher than that of said beating wave, detecting the resulting wave to obtain a fourth wave of said comparatively low frequency, combining said modulated beating wave with a fifth wave of known variable magnitude and of the frequency of said third wave, detecting the resulting wave to obtain a sixth wave of said comparatively low frequency, and balancing the fourth and sixth waves separately against said second wave of comparatively low frequency by a listening method.

8. In combination, means for producing three waves and modulating one of said waves in accordance with the other two to produce a fourth wave, means, having an output circuit, for producing from said fourth wave a fifth wave in said output circuit, and a current transmission path connecting said output circuit and said first means.

9. In combination, means for producing three waves and modulating one of said waves in accordance with the other two to produce a fourth wave, means, having an output circuit, for successively detecting said fourth wave to produce a fifth wave in said output circuit, and means for transmitting one of said two waves to said output circuit.

10. In combination, means for producing three waves and modulating one of said waves in accordance with the other two to produce a fourth wave, means for producing from said fourth wave a fifth wave having the same frequency characteristics as one of said three waves, and means for balancing said one wave against said fifth wave.

11. A system for comparing the magnitude of a first high frequency wave and the magnitude of a second high frequency wave, comprising means for producing from said first wave a third low frequency wave, the magnitude of which is a given unknown function of the magnitude of said first wave, and for producing from said second wave a fourth low frequency wave the magnitude of which is a function, bearing a known relation to said first function, of the magnitude of said second wave, and means for balancing said two low frequency waves against two low frequency waves having magnitudes bearing a known relation to each other and equal respectively to the magnitudes of said first two low frequency waves.

12. A system for comparing the magnitudes of a high frequency wave of given frequency and of unknown magnitude with a comparison wave of like frequency and of known variable magnitude, which comprises means for supplying a beating wave of frequency differing from said given frequency, means for supplying a low frequency modulating wave, means for modulating said beating frequency wave with said low frequency wave to produce a modulated beating wave, means for combining said modulated beating wave with the first mentioned waive to obtain a modulated intermediate frequency wave, means for combining said modulated beating wave with said comparison wave to obtain a second modulated intermediate frequency wave, means for detecting said first modulated intermediate frequency wave to obtain a second wave of said low frequency and for detecting said second modulated intermediate frequency wave to obtain a third wave of said low frequency, and a balancing circuit for balancing said second wave of said low frequency against said first wave of said low frequency and for balancing said third wave of said low frequency against said first wave of said low frequency.

13. A system for measuring field strengths of electromagnetic waves, comprising a receiving antenna, a radio receiver connected thereto, local means for producing a low frequency wave and a high frequency beating wave modulated by said low frequency wave, means for modulating incoming electromagnetic waves by said modulated beating wave, a telephone receiver connected in the output circuit of said radio receiver, a balancing circuit for so connecting said local means and said output circuit in circuit with said telephone receiver that the detected output voltage of said low frequency from said radio receiver is opposed in the latter circuit by a voltage of said low frequency from said local means, a high frequency comparison source of known variable voltage, and means for applying the latter voltage to said radio receiver in place of said incoming electromagnetic waves.

14. The combination with a radio receiving system comprising an antenna and a radio receiver connected to said antenna, of means for determining the overall audio-frequency output voltage audio-frequency characteristic of said system, said means comprising a local high frequency oscillator for impressing waves on said system, generating means for producing a variable audio-frequency wave, a telephone receiver in the output circuit of said radio receiver, and means interlinking said generating means, said high frequency oscillator and the output circuit of said radio receiver, whereby the waves transmitted by said oscillator are modulated in accordance with said audio-frequency wave and the latter wave is balanced against the audio-frequency output wave from said radio receiver as evidenced by said telephone receiver.

In witness whereof, I hereunto subscribe my name this 25th day of June, A. D., 1927.

EDMOND BRUCE.